United States Patent
Ranga et al.

(10) Patent No.: US 11,587,329 B2
(45) Date of Patent: Feb. 21, 2023

(54) METHOD AND APPARATUS FOR PREDICTING INTENT OF VULNERABLE ROAD USERS

(71) Applicant: Valeo Schalter und Sensoren GmbH, Bietigheim-Bissingen (DE)

(72) Inventors: Adithya Ranga, Sunnyvale, CA (US); Jagdish Bhanushali, Sunnyvale, CA (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 34 days.

(21) Appl. No.: 16/727,926

(22) Filed: Dec. 27, 2019

(65) Prior Publication Data
US 2021/0201052 A1 Jul. 1, 2021

(51) Int. Cl.
*G06V 20/58* (2022.01)
*G06T 7/11* (2017.01)
(Continued)

(52) U.S. Cl.
CPC ......... *G06V 20/58* (2022.01); *B60W 30/0956* (2013.01); *B60W 40/04* (2013.01);
(Continued)

(58) Field of Classification Search
CPC ............ B60W 30/0956; B60W 40/04; B60W 2420/42; B60W 2554/40; G06N 3/04;
(Continued)

(56) References Cited

U.S. PATENT DOCUMENTS

| | | |
|---|---|---|
| 9,760,806 B1 | 9/2017 | Ning |
| 10,565,880 B2 | 2/2020 | Aoude |

(Continued)

FOREIGN PATENT DOCUMENTS

| | | |
|---|---|---|
| KR | 101958868 B1 | 7/2019 |
| WO | 2019/116099 A1 | 6/2019 |

OTHER PUBLICATIONS

Kooij et al. "Context-based path prediction for targets with switching dynamics." International Journal of Computer Vision 127.3 (2018): 239-262. (Year: 2018).*

(Continued)

*Primary Examiner* — Katrina R Fujita
(74) *Attorney, Agent, or Firm* — Osha Bergman Watanabe & Burton LLP (57) ABSTRACT

Techniques are described for estimating intentions of pedestrians and other road users in vicinity of a vehicle. In certain embodiments, the techniques comprise obtaining, by a computer system of a vehicle equipped with one or more sensors, a sequence of video frames corresponding to a scene external to the vehicle, detecting one or more vulnerable road users (VRUs) in the sequence of video frames, wherein the detecting comprises estimating pose of each of the detected one or more VRUs. The techniques further include generating a segmentation map of the scene using one or more of the video frames; estimating one or more intention probabilities using estimated pose of the one or more VRUs and the segmentation map, each intention probability corresponding to one of the detected one or more VRUs, and adjusting one or more automated driving actions based on the estimated one or more intention probabilities.

15 Claims, 7 Drawing Sheets

(51) Int. Cl.
  *G06T 7/70* (2017.01)
  *B60W 30/095* (2012.01)
  *B60W 40/04* (2006.01)
  *G06K 9/62* (2022.01)
  *G06N 3/04* (2006.01)
  *G06N 3/08* (2006.01)
  *G06V 40/10* (2022.01)
  *G06V 40/20* (2022.01)

(52) U.S. Cl.
  CPC .............. *G06K 9/628* (2013.01); *G06N 3/04* (2013.01); *G06N 3/08* (2013.01); *G06T 7/11* (2017.01); *G06T 7/70* (2017.01); *G06V 40/10* (2022.01); *G06V 40/20* (2022.01); *B60W 2420/42* (2013.01); *B60W 2554/40* (2020.02); *G06T 2207/10016* (2013.01); *G06T 2207/20081* (2013.01); *G06T 2207/20084* (2013.01); *G06T 2207/30196* (2013.01); *G06T 2207/30236* (2013.01); *G06T 2207/30241* (2013.01); *G06T 2207/30252* (2013.01)

(58) Field of Classification Search
  CPC .. G06N 3/08; G06K 9/628; G06T 7/11; G06T 7/70; G06T 2207/10016; G06T 2207/20081; G06T 2207/20084; G06T 2207/30196; G06T 2207/30236; G06T 2207/30241; G06T 2207/30252; G06V 10/751; G06V 10/764; G06V 20/49; G06V 20/58; G06V 40/10; G06V 40/103; G06V 40/20; G06V 40/23; G08G 1/166
  See application file for complete search history.

(56) References Cited

U.S. PATENT DOCUMENTS

| | | | |
|---|---|---|---|
| 10,824,155 | B2 | 11/2020 | Hong |
| 10,854,079 | B2 | 12/2020 | Aoude |
| 10,913,454 | B2 | 2/2021 | Pindeus |
| 2017/0329332 | A1 | 11/2017 | Pilarski |
| 2018/0096595 | A1 | 4/2018 | Janzen |
| 2018/0253595 | A1 | 9/2018 | Aoki et al. |
| 2019/0124232 | A1* | 4/2019 | Herman ............... H04N 1/6033 |
| 2019/0171871 | A1* | 6/2019 | Zhang ................. G06K 9/6271 |
| 2020/0023842 | A1* | 1/2020 | Gutierrez .......... B60W 30/0956 |
| 2021/0070322 | A1* | 3/2021 | Noy .................... G06K 9/00805 |
| 2021/0081715 | A1* | 3/2021 | Rosman ............... G06N 3/0445 |
| 2021/0103742 | A1* | 4/2021 | Adeli-Mosabbeb ........................ G06K 9/00791 |

OTHER PUBLICATIONS

Xu et al. "Semantic Part RCNN for Real-World Pedestrian Detection." CVPR Workshops. Jan. 2019. (Year: 2019).*

Zhang et al. "Integration convolutional neural network for person re-identification in camera networks." IEEE Access 6 (2018): 36887-36896. (Year: 2018).*

Zhao, Yun, et al. "Joint Holistic and Partial CNN for Pedestrian Detection." BMVC. 2018. (Year: 2018).*

International Preliminary Report on Patentability issued in corresponding Application No. PCT/US2020/066310, dated Jun. 28, 2022 (6 pages).

* cited by examiner

METHOD AND APPARATUS FOR PREDICTING INTENT OF VULNERABLE ROAD USERS

BACKGROUND

Aspects of the disclosure relate to automated driving and more specifically to predicting intention of a user sharing the road with a vehicle.

Motor vehicles are being equipped with increasing amounts of sensor technology designed to assist drivers in manually handling their vehicles in a variety of situations. These sensors enable a variety of features such as parking assist, lane departure warning, and blind spot detection, all of which are now available as add-ons to standard vehicle configurations. Some of these sensors are also being used in connection with automated and autonomous driving. Autonomous driving technology has experienced rapid development in recent years, but is still a long way from being able to operate without human control in all situations.

One commonly encountered situation that poses a difficult challenge to automated control system of a vehicle is understanding behaviors of pedestrians and other road users. Pedestrians are moving on urban roads with specific targets and goals in mind. While navigating the road, pedestrians directly interact with other road users and make decisions accordingly. An automated or autonomous vehicle needs to identify and estimate trajectories of all the other vehicles, pedestrians, humans riding bikes, scooters and other devices in order to safely navigate the road.

BRIEF SUMMARY

Methods, apparatuses, and computer-readable media are disclosed for estimating intentions of a vulnerable road user (VRU) on or around a roadway. In one embodiment, the method includes obtaining, by a computer system of a vehicle equipped with one or more sensors, a sequence of video frames corresponding to a scene external to the vehicle. The computer system detects one or more VRUs in the sequence of video frames. The detecting may include estimating pose of each of the detected one or more VRUs. The computer system further generates a segmentation map of the scene using one or more of the video frames and estimates one or more intention probabilities using estimated pose of the one or more VRUs and the segmentation map. Each intention probability may correspond to one of the detected one or more VRUs. The computer system further adjusts one or more automated driving actions based on the estimated one or more intention probabilities.

In one embodiment, the computer system estimates one or more behavior states based at least on the estimated pose of the VRUs, and estimates future trajectories of the one or more VRUs using the estimated one or more behavior states. In addition, the computer system may use past states of the VRU and detected pose and bounding boxes to estimate the future trajectories. Each behavior state may correspond to one of the detected VRUs.

In one embodiment, the steps of detecting, generating and estimating may be performed using a holistic deep learning neural network model by sequentially correlating the estimated pose of the one or more VRUs and their corresponding behavior state with a segmented scene in the vicinity of each of the VRUs.

In one embodiment, the computer system further estimates the one or more intention probabilities by estimating the one or more behavior states based at least on the estimated pose of the one or more VRUs using a multi-task model, and estimating the one or more intention probabilities based on the estimated one or more behavior states.

In one embodiment, the computer system estimates the one or more behavior states by applying a neural network architecture to a continuous sequence of poses of each of the one or more VRUs to select a behavior state for the VRU among a plurality of predefined behavior states.

In one embodiment, the computer system generates the segmentation map by applying a neural network architecture to one or more of the video frames to classify each pixel in the video frames as one of a plurality of predefined classes. Each class may correspond to a segment in the segmentation map.

In one embodiment, the computer system selects at least one high-risk VRU from among the one or more VRUs based on the predicted behavior state and proximity of each VRU to the vehicle. The computer system may then notify a driver of the vehicle of the risky behavior or change trajectory of an autonomous vehicle to avoid a future accident involving the high-risk VRU.

In one embodiment, the computer system estimates the intention probabilities of the one or more VRUs by analyzing social interactions between the one or more VRUs and one or more classes corresponding to objects in the segmentation map.

In one embodiment, a computer system including at least one processor and a memory coupled to the at least one processor is described. The at least one processor is configured to obtain a sequence of video frames corresponding to a scene external to a vehicle captured by one or more sensors. The at least one processor is further configured to detect one or more VRUs in the sequence of video frames and estimate pose of each of the detected one or more VRUs, generate a segmentation map of the scene using one or more of the video frames, estimate one or more intention probabilities using estimated pose of the one or more VRUs and the segmentation map, and adjust one or more automated driving actions based on the estimated one or more intention probabilities. Each intention probability may correspond to one of the detected one or more VRUs.

In one embodiment, a computer-readable storage medium is described. The computer-readable storage medium stores instructions that, when executed by one or more processors of a vehicle computer system, cause the one or more processors to obtain a sequence of video frames corresponding to a scene external to the vehicle. The sequence of video frames is captured using one or more sensors. The instructions further cause the one or more processors to detect one or more VRUs in the sequence of video frames, wherein the detection comprises estimating pose of each of the detected one or more VRUs, generate a segmentation map of the scene using one or more of the video frames, estimate one or more intention probabilities using estimated pose of the one or more VRUs and the segmentation map, each intention probability corresponding to one of the detected one or more VRUs, and adjust one or more automated driving actions based on the estimated one or more intention probabilities.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The term "Vulnerable Road User" (VRU) is used herein to refer to a class of Pedestrians, cyclists, humans on motorbikes, humans riding scooters, and the like. In general, VRU refers to any human on or around a roadway that directly interacts with vehicles on roads. In general, VRUs may have a potentially higher risk of accident than a person sitting inside a vehicle.

The present disclosure relates to techniques for detecting and identifying vulnerable road users. The embodiments described herein may be used in vehicles that offer various degrees of automated driving capabilities, ranging from partial driver assistance to full automation of all aspects of the driving task. The National Highway Traffic Safety Administration (NHTSA) and Society of Automotive Engineers (SAE) International define levels of vehicle autonomy as follows: Level 0, where the driver is in full control of the vehicle; Level 1, where a driver assistance system controls steering or acceleration/deceleration; Level 2, where the driver assistance system controls steering and acceleration/deceleration, and where the driver performs all other aspects of the driving task; Level 3, where all aspects of driving are performed by the driver assistance system, but where the driver may have to intervene if special circumstances occur that the automated vehicle is unable to safely handle; Level 4, where all aspects of driving are performed by the driver assistance system, even in situations where the driver does not appropriately respond when requested to intervene; and Level 5, where the vehicle drives fully autonomously in all driving situations, with or without a passenger.

In this document, the term is "automated driving" is used to refer to any driving action that is performed by an automated driving system. For example, when a "lane keep assistant" is activated, the actions performed by the lane keep assistant (e.g., automated driving system) are referred to as "automated driving actions." In contrast, any driving action that is performed by a human driver is considered a manual driving action. In level 1 through level 3 of automation, some form of automated driving actions may be performed when the driver assistance system controls at least some aspects of driving. However, in level 1 through level 3, some input from a human driver can still be expected. In this document, the term "autonomous vehicle" is used to refer to a vehicle using levels 4 and 5 of automation, where the system performs automated driving actions most or all the time and there is little or no intervention by a human driver.

Advanced perception and path planning systems are at the core for any autonomous vehicles. Autonomous vehicles need to understand their surroundings and intentions of other road users for safe motion planning. For urban use cases, it is very important to perceive and predict intentions of pedestrians and other VRUs. Certain embodiments disclose a system for estimating and predicting intentions of one or more VRUs in the surroundings of a vehicle. Intention of a VRU are estimated using a combination of current activities of the VRU, its interactions with other vehicles and VRUs, and long-term trajectories defining future motion of the VRUs. The intent prediction system utilizes an end-to-end trained deep neural network model that classifies activities of the VRUs and forecasts their future trajectories using sequences of video frames as input.

It is very important for any automated or autonomous vehicle or robot to understand the state, behavioral patterns and overall intention of humans that are located in close proximity to the vehicle or robot. Conventional methods in the art treat all the actors in the scene as points in space, and behavior prediction modules are model-based, rule-based or probabilistic systems using only high-level information. However, these conventional methods fall short in accurately understanding and predicting the behaviors of VRUs compared to other class of objects in the scene (e.g., vehicles, trucks, and the like).

Utilizing Artificial Intelligence (AI) and deep learning, certain embodiments tackle some of the challenging problems especially in the field of autonomous driving and robotics. One such challenge for any delivery robot or self-driving car on urban roads is path planning while constantly engaging with pedestrians and cyclists. Pedestrians on roads move around with specific goals while respecting certain rules and interacting with other actors in the scene. In general, human drivers are very good at understanding the state of pedestrians and predicting their intentions while driving and deciding whether or not they need to yield right of way to the pedestrians.

Certain embodiments present a VRU intent prediction system that detects/estimates gait, speed, head and body pose, actions (carrying objects, pushing carts, holding a child, etc.) and awareness/distraction (talking on the phone, wearing a headset, etc.) levels of humans on the road, and utilize these behavioral patterns to predict future trajectories of the humans in or around the road. The VRU intent prediction system uses artificial intelligence and is trained on video sequences to recognize activities of VRUs on urban roads, and predict their trajectories. The combination of short-term discrete activity recognition and future continuous trajectory prediction summarizes the intention for VRUs and provides an accurate input to a path-planning module in the autonomous vehicle.

Certain embodiments take advantage of low-level features for each VRU in the scene and use a data driven deep learning approach to learn state and behavioral interactions of the VRUs with the overall scene. The method disclosed herein perceives and understands the human behaviors and temporally predicts continuous trajectories weighing from the past history of state and spatial inputs.

Figure 1:
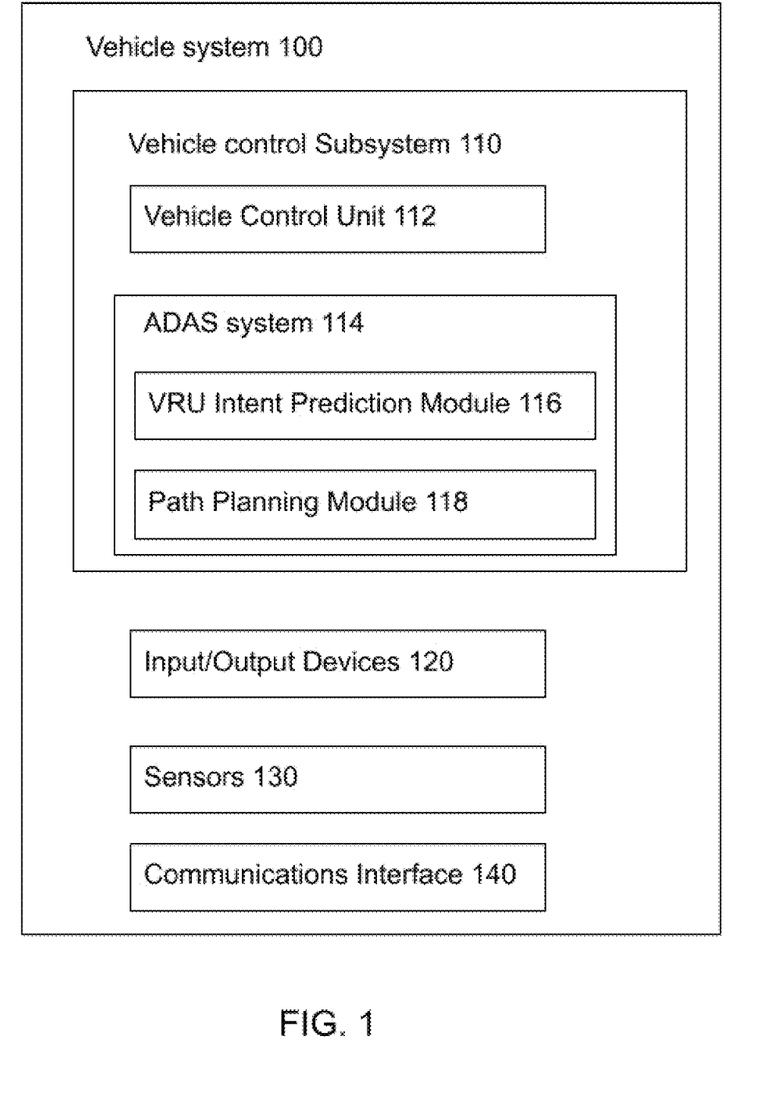
FIG. 1 is a simplified block diagram of a vehicle system that may utilize the disclosed intent prediction system, in accordance with certain embodiments of the present disclosure.

FIG. 1 is a simplified block diagram of a vehicle system 100 that may utilize the disclosed intent prediction system, according to certain embodiments. The vehicle system 100 may be an automated or autonomous vehicle. The vehicle system 100 includes a vehicle control subsystem 110, one or more I/O devices 120, one or more sensors 130, and one or more communications interfaces 140.

Vehicle control subsystem 110 comprises a computer system that includes one or more vehicle control units 112 (e.g., electronic control units or ECUs). The vehicle control units 112 may include any number of embedded systems that each control one or more sensors, electrical systems or other subsystems of a vehicle. Examples of vehicle control units 112 include, without limitation, an engine control unit, a power steering control unit, a powertrain control module, a speed control unit, a telematics control unit, a transmission control unit, a brake control module, a camera control module, a LIDAR control module or any other type of control module.

In some embodiments, vehicle control units 112 may comprise one or more processors and one or more non-transitory computer-readable media storing processor-executable instructions. For instance, a vehicle control unit 112 may include a processor configured to execute a software application that processes sensor information to determine an automated driving operation (e.g., determining trajectories of VRUs surrounding the vehicle and taking action if their trajectories cross the vehicle's path) or to generate output for a vehicle occupant or driver via an I/O device 120.

Sensors 130 may comprise any number of devices that provide information about the vehicle in which vehicle system 100 is deployed and/or an environment external to the vehicle. Examples of sensors 130 include, without limitation, a camera, a microphone, a radar sensor, an ultrasonic sensor, a LIDAR sensor, a global positioning system (GPS) sensor, a steering angle sensor, and/or a motion sensor (e.g., an accelerometer and/or gyroscope). In particular, vehicle system 100 may be equipped with one or more cameras that can be used to detect and localize VRUs in vicinity of the vehicle.

In some embodiments, vehicle control subsystem 110 includes an advanced driver assistance system (ADAS) 114. The ADAS system 114 may include an automated cruise control system, a blind spot detection system, a parking assistance system, emergency braking system or any other type of automated system. In addition, the ADAS system may include a VRU intent prediction module 116 and a path planning module 118, as described herein.

In some embodiments, the ADAS system 114 may comprise hardware (e.g., an actuator) and/or software that enables autonomous performance of an advanced driver assistance system. In some embodiments, ADAS system 114 may comprise a set of instructions that coordinate between one or more vehicle control units 112 (e.g., a power steering control unit and/or a powertrain control module) and one or more sensors 130 (e.g., a camera, a radar sensor, an ultrasonic sensor, and/or a LIDAR sensor) to identify VRUs and their trajectories, detect an imminent collision and actuate automatic emergency braking.

I/O device 120 can include audio output devices, haptic output devices, displays and/or other devices that can be operated to generate output for a vehicle occupant in connection with a manual or an automated operation.

Communications interface 140 includes a wireless communications interface configured to send messages to, and receive messages from other vehicles and other devices. Vehicle messages can be transmitted as V2X, DSRC or can be compliant with any other wireless communications protocol. Communications interface 140 may further include a transceiver configured to communicate with one or more components of a global positioning system (e.g., a satellite or a local assistance server).

Figure 2:
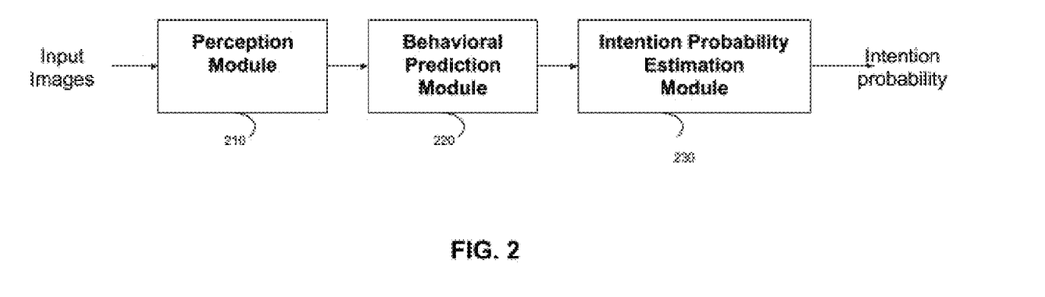
FIG. 2 illustrates an example high-level block diagram of the VRU intent prediction system, in accordance with certain embodiments of the present disclosure.

FIG. 2 illustrates an example high-level block diagram of the VRU intent prediction system 200, in accordance with certain embodiments of the present disclosure. The VRU intent prediction system 200 can implement VRU intent prediction module 116 in FIG. 1 and includes a perception module 210, a behavior prediction module 220, and an intent prediction module 230.

The perception module 210 detects, identifies and localizes VRUs in the scene. Furthermore, the perception module estimates a two dimensional (2D) pose and a 3D bounding box for each detected VRU in the scene. Furthermore, the perception module 210 tracks the detected VRUs in the 3D scene. In addition, the perception module utilizes a segmentation deep neural network that classifies each pixel of an input image to belong to one of several known classes of objects. In one example, the pixel classification may be done using a semantic scene segmentation technique by passing the input images through an encoder-decoder architecture to generate a scene description. Outputs of the perception module may include 2D bounding box, key points, scene segmentation mask and the like. In addition, the perception module 210 detects objects in the scene using an image or video frame as an input.

The behavior prediction module 220 receives the scene description and pose estimations from the perception module, and detects activity and state of each VRU in the scene. In addition, the behavior prediction module 220 receives a history of past locations of one or more VRUs and outputs the future possible pixel locations of all the VRUs in the scene.

The intent prediction module 230 receives estimated trajectory of the VRUs and their activity state as an input and outputs a probability that the VRU's intended path will cross the vehicle's path.

Figure 3:
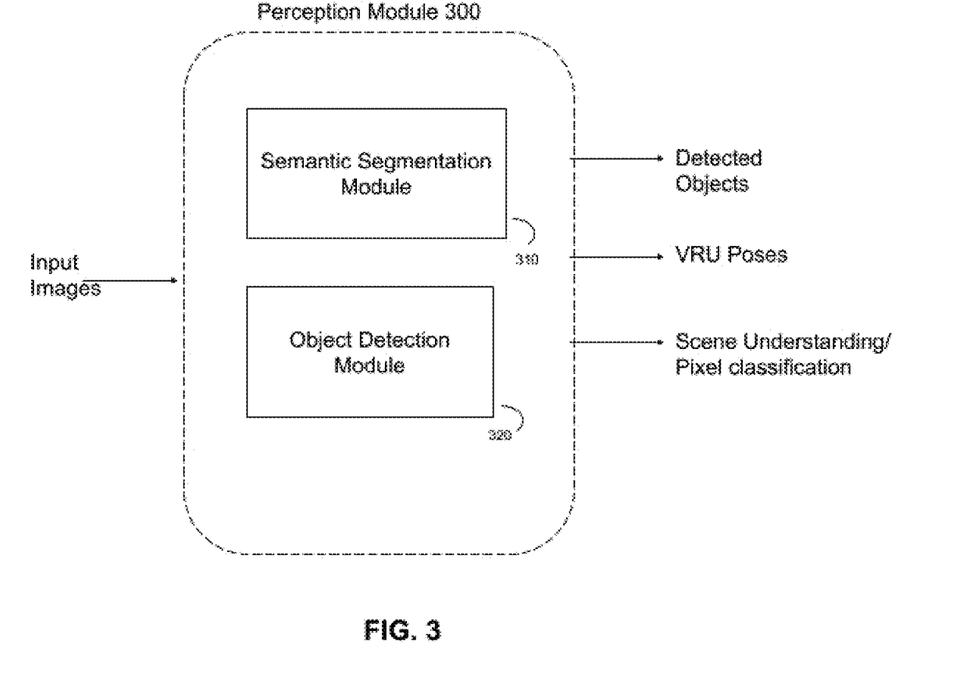
FIG. 3 illustrates an example perception module, in accordance with certain embodiments of the present disclosure.

FIG. 3 illustrates an example perception module 300, in accordance with certain embodiments of the present disclosure. The perception module 300 can implement the perception module 210 in FIG. 2. The perception module 300 may include a semantic segmentation module 310, and an object detection and human pose estimation module 320. The semantic segmentation module 310 runs in parallel with the object detection module 320 to generate an understanding of the scene. The semantic segmentation module 310 associates all the pixels of the scene with their respective classes and outputs a full scene description that can be correlated to the 2D spatial location of the persons in scene. In one embodiment, the semantic segmentation module 310 utilizes an encoder decoder architecture. As an example, the semantic segmentation module 310 may use a VGG or ResNet deep neural network model as an Encoder that is pre-trained on known datasets such as ImageNet, along with a Unet or fully convolutional network (FCN) decoder neural network. In one example, the model takes an image as input and uses 2D CNN layers with some pooling layers and batch normalization to encode the scene. Furthermore, the model uses a decoder to reconstruct a full resolution segmentation mask. The model is trained against annotated semantic segmentation data to match each pixel to a proper class. In the case of scene segmentation, the output includes classification of each pixel into a set of predefined classes, such as persons, landmarks, cars, roads, curbs, traffic signs, etc.

The object detection module 320 includes a pre-trained object detection network, and a 2D human pose estimation network that are used to encode all of the visual cues (features) for each individual in the scene. Two-dimensional spatial location and 2D key points and pose for each pedestrian in the scene provide low-level features and description about their body and head orientation in each image and relative limb movement across sequence of images. This information is very rich compared to using just 2D or 3D location of object in pixel or world coordinates, respectively.

Figure 4:
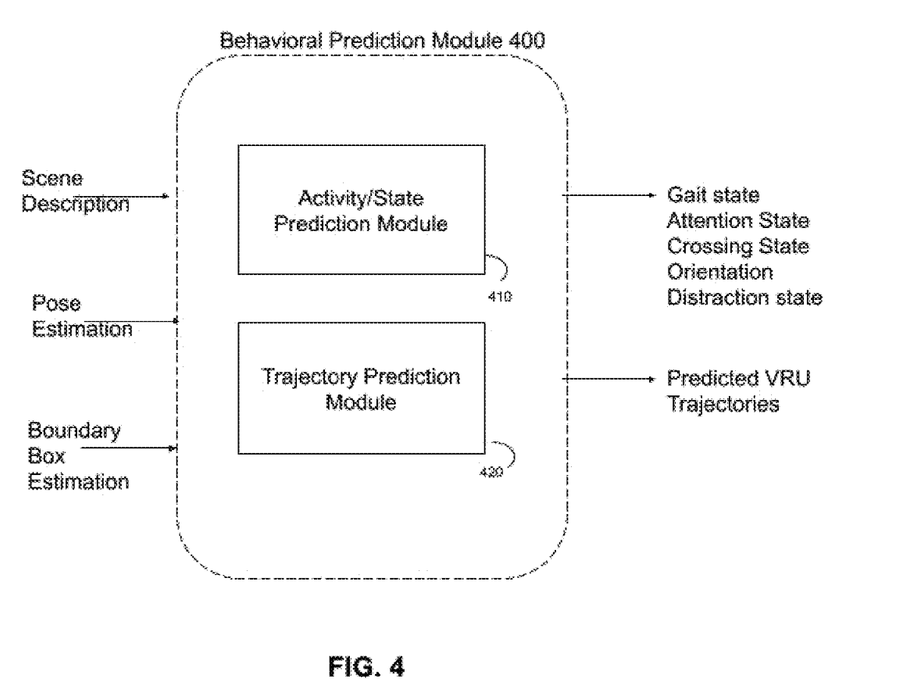
FIG. 4 illustrates an example behavior prediction module, in accordance with certain embodiments of the present disclosure.

FIG. 4 illustrates an example behavior prediction module 400, according to one aspect of the present disclosure. The behavior prediction module 400 may implement behavior prediction module 220 in FIG. 2 and includes an activity/state prediction module 410 and a trajectory prediction module 420. The activity prediction module 410 receives scene description and pose estimation of each of the detected VRUs from the perception module 300. The activity prediction module 410 uses a sequence of past history of 2D VRU poses, bounding boxes of each VRU for the past N frames to recognize the following classes or states:

Motion State (Gait): Walking/Standing/Sitting,
Awareness State: Looking/Not Looking,
Distraction State: Chatting on Device, talking with another person,
Orientation: Left/Right/Back/Front.

The activity prediction module 410 transforms sequential inputs of 2D bounding boxes, 2D pose and relative pose between sequence of video frames to get object-level feature representations. In one example, the activity prediction module 410 passes its input values through linear embedding layers and recurrent neural network (RNN) layers to perform spatial and temporal transformation. Fused scene and object encoding are passed through final dense layers to generate outputs of activity classes. In this manner, given information about the last N frames as input to the LSTM units, the model learns to recognize the activities/state of all the pedestrians in the scene. The disclosed system learns multiple classes of activities and trajectories along with final VRU intentions, hence it is a multi-task learning model.

The trajectory Prediction Module 420 estimates trajectories of the VRUs that are detected in the scene. For a given length of sequential input data, the network uses convolutional neural network encoding layers to encode both 2D poses and 2D/3D bounding boxes from the perception module. Sequential object encoding and scene encoding are fused and passed to a decoder with recurrent units (e.g., LSTM) to output future 2D pixel locations of each individual VRU in the scene.

The output xy pixel locations are trained against ground truth trajectory values using a squared L2 loss. During inference, by using an input history of VRU locations in the past N frames, the trajectory prediction module predicts the possible future pixel locations of all the VRUs in the scene for the next t+n frames. In one example, the trajectory prediction module 420 utilizes the same neural network model as the activity prediction model with a separate branch for estimating trajectories. In one embodiment, the trajectory prediction module 420 uses a recurrent encoder-decoder model that is trained on outputs from object detection module.

Social Interaction Learning:

VRUs in the scene interact with other objects (other VRUs, vehicles, etc.) and move with specific defined goals in mind. There is a social interaction element between pedestrians and/or other VRUs that the models need to understand and accurately predict for each person on the road. Predicting intentions and identifying social interactions of the VRUs increases accuracy of the system in predicting future trajectories of the VRUs and their intentions on crossing path of the vehicle.

Current methods in the art such as Socially Acceptable Trajectories with Generative Adversarial Networks (Social GAN)/Social LSTM from academic research present idea of social learning using feature pooling for pedestrians. However, these models are very restricted to modelling only the interactions between pedestrians only. Certain embodiments present methods to model social interactions between one or more pedestrians and interactions between pedestrians and other objects, and the scene. Certain embodiments predict the interactions between pedestrians and other objects in the scene by including rich encoded scene semantics as input features to the trajectory prediction module to identify and detect the potential interaction of pedestrians with the scene.

Weighted Learning:

Certain embodiments uniquely qualifies and models the dynamics involved with pedestrians walking in a group, carrying something, holding other users or objects physically, and the like. It should be noted that behavioral intent is very different for each of the above cases. In one embodiment, annotated labels may be added to the model that identify whether each VRU belongs to a group or is an individual. Including this supervised learning capability in the model enables the system to react differently when the pedestrians/VRUs have different group dynamics. Social Pooling of encoding layers is used to learn the interaction between pedestrians.

Figure 5:
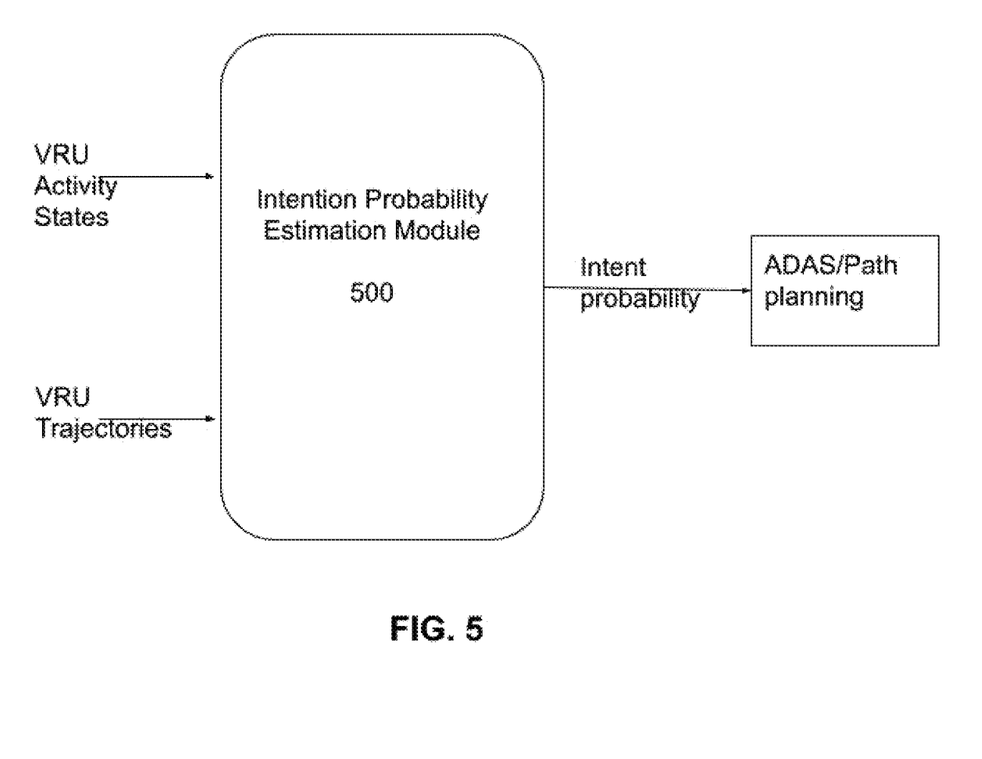
FIG. 5 illustrates an example block diagram of an intent prediction module, in accordance with certain embodiments of the present disclosure.

FIG. 5 illustrates an example intention probability prediction module 500, in accordance with certain embodiments of the present disclosure. In one embodiment, trajectory predictions and activity predictions are input to final dense layers of the DNN model to estimate/predict the final intention with probabilities for each VRU. Certain embodiments use weighted cross-entropy losses for training each individual class labels for behavior module and a separate ridge regression loss function is used for training trajectory models. As illustrated, the intention probability prediction module receives VRU activity states (e.g., gait, attention, facing, crossing, etc.) and VRU trajectory as an input. The intention probability prediction module estimates a probability for intention of each of the VRUs. As an example, the intention probability prediction module estimates the probability that the VRU is going to cross the future trajectory of the vehicle. For example, if a first pedestrian is standing next to a crosswalk and actively pays attention to the red/green crossing lights, the intent probability for crossing the roadway for this first pedestrian will be high. In another example, if a second pedestrian is standing at an intersection, but it is close to the side of the building rather than the roadway, and is talking on his/her phone, the crossing intention probability for the second pedestrian is lower than the first pedestrian (maybe the second pedestrian is waiting to meet his friend at the intersection).

The VRU intent prediction system provides current state and future predictions as input to the planning module or to the warning system on ADAS/automated driving (AD) capable vehicles. For ADAS applications, the VRU intent prediction system may serve as a warning system to let the driver behind the wheel take control or alert when we sense an anomaly or risky intention from pedestrians in 360 scene. Similarly, the autonomous car needs to estimate correctly the intentions of road users (e.g., VRUs, cars, ... ) to plan its trajectory and maneuvers accordingly. For any delivery robot (food, groceries, last mile etc.), the robot has to constantly engage with pedestrians and cyclists on curb and navigate.

Figure 6:
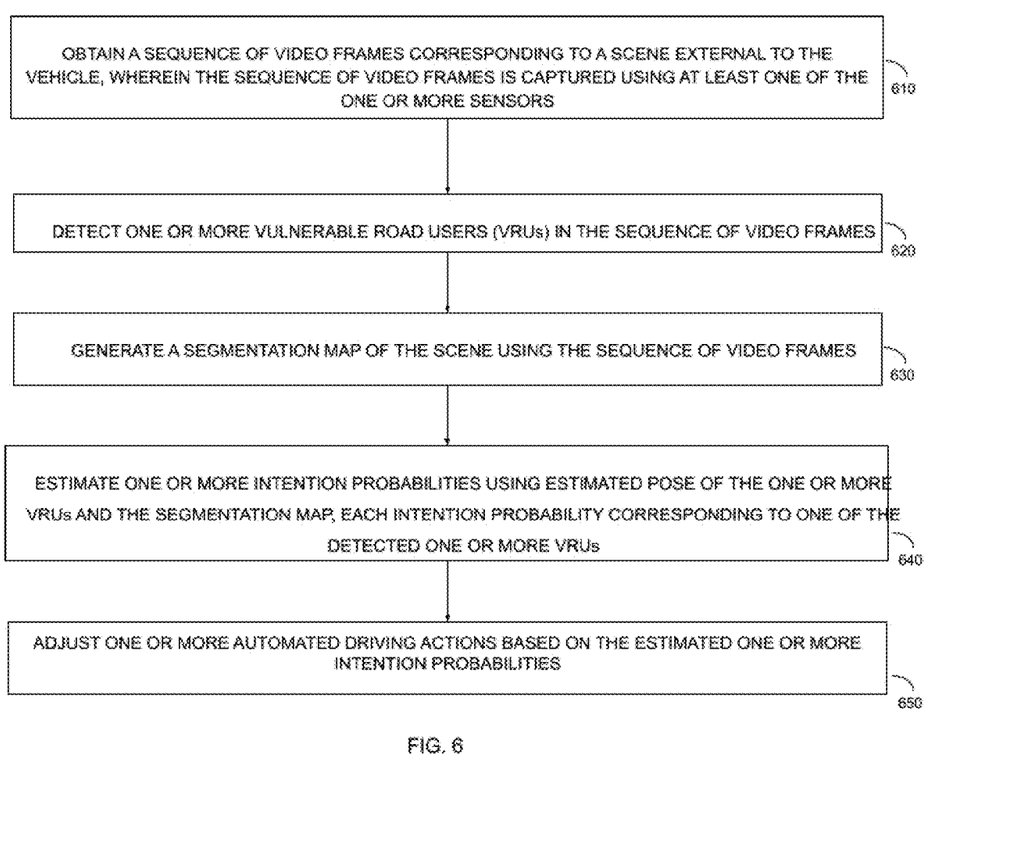
FIG. 6 illustrates an example flow diagram of the proposed method, in accordance with certain embodiments of the present disclosure.

FIG. 6 illustrates an example flow diagram of the proposed method, in accordance with certain embodiments of the present disclosure. At 610, a computer system of a vehicle equipped with one or more sensors obtains a sequence of video frames corresponding to a scene external to the vehicle. The sequence of video frames may be captured using at least one of the one or more sensors. As an example, the sequence of video frames may be captured using one or more fisheye cameras.

At 620, the computer system detects one or more VRUs in the sequence of video frames. In one example, the computer system identifies one or more VRUs in the scene, generates a bounding box for each of the VRUs in the scene and estimates pose of each of the detected one or more VRUs.

At 630, the computer system generates a segmentation map of the scene using one or more of the video frames. In one example, the computer system classifies each segment of the scene to one of multiple classes of objects in the scene. In one example, the computer system generates the segmentation map by applying a neural network architecture to the sequence of video frames to classify each pixel in the sequence of video frames as one of a plurality of predefined classes, each class corresponding to a segment in the segmentation map. In one embodiment, the segmentation map is performed on each frame of video or image.

At 640, the computer system estimates one or more intention probabilities of the one or more VRUs using estimated pose of the one or more VRUs and the segmentation map. Each intention probability may correspond to one of the detected one or more VRUs.

In one example, the computer system estimates the one or more intention probabilities by analyzing social interactions between the one or more VRUs and one or more classes corresponding to objects in the segmentation map.

In one example, the computer system estimates the one or more intention probabilities by first estimating the one or more behavior states based at least on the estimated pose of the one or more VRUs using a multi-task model, and utilizing the estimated behavior states to estimate the one or more intention probabilities.

In one example, the computer system may estimate one or more behavior states based at least on the estimated pose of the VRUs. Each behavior state may correspond to one of the detected VRUs. The computer system may estimate the one or more behavior states by applying a neural network architecture to a continuous sequence of poses of each of the one or more VRUs to select a behavior state for the VRU from among a plurality of predefined behavior states. As mentioned earlier, the predefined behavior states may be gait, attention, facing, crossing, and the like. The computer system may then estimate future trajectories of the one or more VRUs using the estimated one or more behavior states.

In one example, the above mentioned steps of detecting, generating and estimating are performed using a holistic deep learning neural network model by sequentially correlating the estimated pose of the one or more VRUs and their corresponding behavior state with a segmented scene in the vicinity of each of the VRUs.

At 650, the computer system adjusts one or more automated driving actions based on the estimated one or more intention probabilities. As an example, the automated driving action might be generating a warning for the driver of the vehicle of an imminent crash with a VRU that is about to enter the roadway and cross paths with the vehicle. In another example, the automated driving action might be changing the trajectory of an automated or autonomous vehicle to avoid hitting the pedestrian that is about to enter the roadway. In another example, the action might be activating the automatic emergency braking system to avoid hitting the pedestrian. It should be noted that any other automated driving action may fall within the scope of the present disclosure. In one embodiment, the computer system may select at least one high-risk VRU from among the one or more VRUs based on the predicted behavior state and proximity of each VRU to the vehicle. The computer system may then notify the driver or the automated driving system of the presence of the high-risk VRU (e.g., a child who is about to run into the road and cross the trajectory of the vehicle, etc.)

Figure 7A:
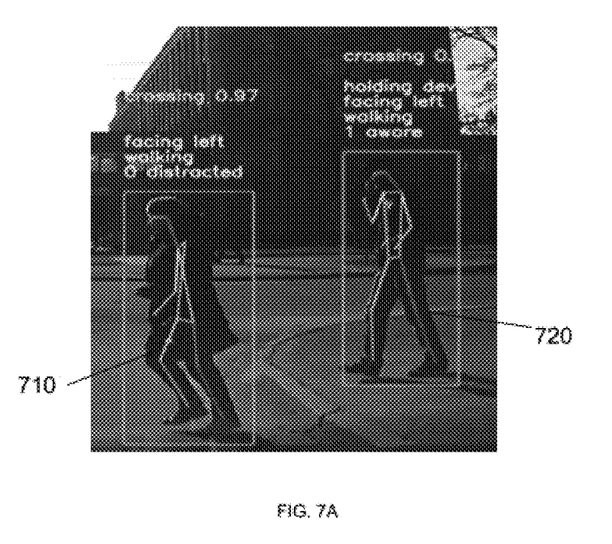
FIGS. 7A and 7B illustrate example trajectory estimation and intent predication results on two example images, in accordance with certain embodiments of the present disclosure.
Figure 7B:
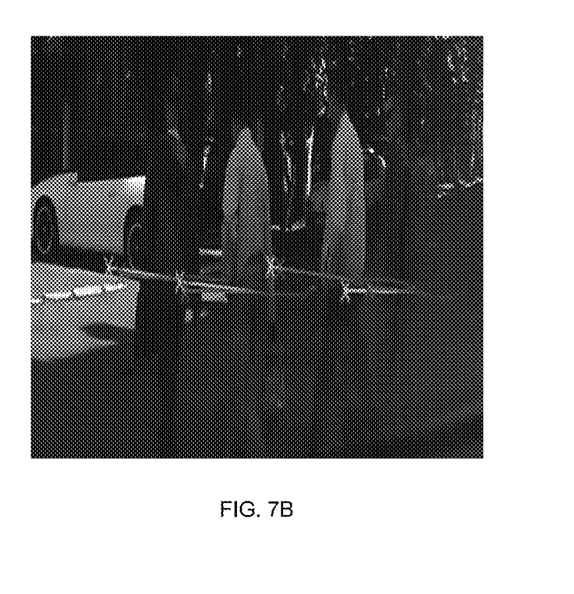

FIGS. 7A and 7B illustrate example outputs of the intent predication system on two example images, in accordance with certain embodiments of the present disclosure.

FIG. 7A illustrates an example image that is marked with outputs of the activity prediction module. As shown in FIG. 7A, two pedestrians are walking on or towards a roadway. The first pedestrian 710 is facing left, and is walking distracted. The probability of this pedestrian passing the roadway and crossing path with the vehicle is 0.97. The other pedestrian 720 is still on the sidewalk, is holding a device and is facing left, walking and is aware of his surroundings. Probability of this pedestrian intending to cross the road in the next few time stamps is at 0.82.

FIG. 7B illustrates another example of pedestrians walking in the vicinity of a vehicle. In this image, walking trajectories of four pedestrians are shown. These trajectories are then used by the intent probability estimation system to estimate the probability of each of these pedestrians (e.g., VRU) crossing the roadway. An automated system may then use the estimated probability in its path planning system to estimate its own trajectory to prevent any accidents.

Advantages of the VRU Intention Detection System

The VRU intention prediction system presented herein improves accuracy of estimation of future path of pedestrians and other road users. By utilizing low-level information about each VRU, the intent prediction system can predict intention of each of the VRUs in near future for crossing the roadway or staying in the sidewalk. An automated or autonomous vehicle can utilize the VRU intention prediction system to improve its overall operation safety while driving on urban roads. As a result, the intention prediction system improves safety of VRUs that share the road with the vehicle. As an example, when the automated or autonomous vehicle detects that a VRU is about to cross the road, it may reduce its speed and/or stop to yield to the VRU (e.g., if the VRU has right of way). In case the VRU does not have a right of way (e.g., the pedestrian crossing light is red), the automated or autonomous vehicle may continue its path while paying extra attention to the VRU in the scene that is marked as a high-risk VRU, to prevent any future accident (e.g., if the VRU decides to walk into the roadway).

The VRU intention prediction system disclosed herein has several advantages. First, by understanding the intentions of pedestrians and other class of VRUs, any autonomous vehicle or robot on urban roads can achieve a naturalistic driving behavior-similar to how humans drive and interact with VRUs in the scene. In addition, by using the low-level information about VRU pose and 3D positions in the scene and correlating the changes in sequence of frames—temporally, the VRU intent prediction model achieves about 98 percent accuracy in recognizing activities such as gait, awareness, distraction (as trained and evaluated on annotated data.

Furthermore, by using a multi-task learning approach, or a single deep neural network that can be trained using supervised training data, certain embodiments achieve the task of predicting behaviors, future trajectories and intentions with much smaller (e.g., 30-40 percent) computing and memory requirements. This is because the network takes advantage of weight sharing and cross-correlating the significance of low-level features, behaviors and predicted trajectories. This leads to significant improvement in the quality and accuracy of activity recognition, trajectory prediction and intention prediction.

Certain embodiments use the disclosed VRU intention prediction method on images from fisheye cameras, and/or 360-degree view cocoon cameras (e.g., one camera in front of the vehicle, one camera in rear of the vehicle, and two cameras on the sides of the vehicle) to achieve 360-degree detection and prediction capability for VRUs surrounding the vehicle. The disclosed system not only helps with front collision warning and motion planning, but also for rear driving mode (e.g., while backing out of parking spots or to improve the prediction horizon for rear AEB (automatic emergency braking). Thereby, a control system can initiate the braking process much earlier by predicting future states of VRUs.

Furthermore, using scene segmentation mask as input, the system learns and predicts trajectories and activities of VRUs, by considering the physical interactions and causality between current behaviors of VRUs and different elements of the scene. As an example, the proposed system understands and predicts that pedestrians or cyclists cannot go through cars or buildings in the scene and accurately predicts trajectories around such elements. In addition, social behavior understanding between individuals or a group of VRUs, and VRUs and other objects in the scene is improved.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A method comprising:
   obtaining, by a computer system of a vehicle equipped with one or more sensors, a sequence of video frames corresponding to a scene external to the vehicle, wherein the sequence of video frames is captured using at least one of the one or more sensors;
   detecting, by the computer system, one or more vulnerable road users (VRUs) in the sequence of video frames,
       wherein the detecting comprises estimating a pose of each of the detected one or more VRUs;
   generating, by the computer system, a full resolution segmentation map of the scene using one or more of the video frames,
       wherein the generating of the full resolution segmentation map comprises applying a neural network architecture to one or more of the video frames to classify each pixel in the video frames as one of a plurality of predefined classes, each predefined class corresponding to a segment in the full resolution segmentation map;
   estimating, by the computer system, one or more intention probabilities using the estimated pose of the one or more VRUs and the full resolution segmentation map, each intention probability corresponding to one of the detected one or more VRUs based on physical interactions and causality between current behaviors and different elements of the scene; and
   adjusting, by the computer system, one or more automated driving actions based on the estimated one or more intention probabilities,
   wherein the detecting, the generating, and the estimating are performed using a single holistic deep learning neural network model by sequentially correlating the estimated pose of the one or more VRUs and their corresponding behavior state with a segmented scene in the vicinity of each of the VRUs.

2. The method of claim 1, further comprising:
   estimating, by the computer system, one or more behavior states based at least on the estimated pose of the one or more VRUs, each behavior state corresponding to one of the detected one or more VRUs; and
   estimating, by the computer system, future trajectories of the one or more VRUs using the estimated one or more behavior states.

3. The method of claim 1, wherein the estimating of the one or more intention probabilities comprises:
   estimating one or more behavior states based at least on the estimated pose of the one or more VRUs using a multi-task model; and
   estimating the one or more intention probabilities based on the estimated one or more behavior states.

4. The method of claim 3, wherein the estimating of the one or more behavior states comprises:
   applying a neural network architecture to a continuous sequence of poses of each of the one or more VRUs to select a behavior state for a VRU from among a plurality of predefined behavior states.

5. The method of claim 1, further comprising:
   selecting, by the computer system, at least one high-risk VRU from among the one or more VRUs based on a predicted behavior state and a proximity of each VRU to the vehicle.

6. The method of claim 1, further comprising:
   estimating, by the computer system, the one or more intention probabilities by analyzing social interactions between the one or more VRUs and one or more classes corresponding to objects in the full resolution segmentation map.

7. A computer system comprising:
   at least one processor; and
   a memory coupled to the at least one processor, the at least one processor being configured to:

obtain, a sequence of video frames corresponding to a scene external to a vehicle captured by one or more sensors;

detect one or more vulnerable road users (VRUs) in the sequence of video frames,
wherein the detecting comprises estimating a pose of each of the detected one or more VRUs;

generate a full resolution segmentation map of the scene using one or more of the video frames,
wherein the generating of the full resolution segmentation map comprises applying a neural network architecture to one or more of the video frames to classify each pixel in the video frames as one of a plurality of predefined classes, each predefined class corresponding to a segment in the full resolution segmentation map;

estimate one or more intention probabilities using the estimated pose of the one or more VRUs and the full resolution segmentation map, each intention probability corresponding to one of the detected one or more VRUs based on physical interactions and causality between current behaviors and different elements of the scene; and adjust one or more automated driving actions based on the estimated one or more intention probabilities, wherein the detecting, the generating, and the estimating are performed using a single holistic deep learning neural network model by sequentially correlating the estimated pose of the one or more VRUs and their corresponding behavior state with a segmented scene in the vicinity of each of the VRUs.

8. The computer system of claim 7, wherein the at least one processor is further configured to:
estimate one or more behavior states based at least on the estimated pose of the one or more VRUs, each behavior state corresponding to one of the detected one or more VRUs; and
estimate future trajectories of the one or more VRUs using the estimated one or more behavior states.

9. The computer system of claim 7, wherein the at least one processor is further configured to: estimate the one or more intention probabilities by:
estimating the one or more behavior states based at least on the estimated pose of the one or more VRUs using a multi-task model, and
estimating the one or more intention probabilities based on the estimated one or more behavior states.

10. The computer system of claim 9, wherein the at least one processor is further configured to:
estimate the one or more behavior states by applying a neural network architecture to a continuous sequence of poses of each of the one or more VRUs to select a behavior state for a VRU from among a plurality of predefined behavior states.

11. The computer system of claim 7, wherein the at least one processor is further configured to:
select at least one high-risk VRU from among the one or more VRUs based on a predicted behavior state and proximity of each VRU to the vehicle.

12. The computer system of claim 7, wherein the at least one processor is further configured to: estimate the one or more intention probabilities by analyzing social interactions between the one or more VRUs and one or more classes corresponding to objects in the full resolution segmentation map.

13. A non-transitory computer-readable medium comprising instructions that, when executed by one or more hardware processors of a computer, cause the computer to perform operations comprising:

obtaining a sequence of video frames corresponding to a scene external to the vehicle,
wherein the sequence of video frames is captured using one or more sensors;

detecting one or more vulnerable road users (VRUs) in the sequence of video frames,
wherein the detecting comprises estimating a pose of each of the detected one or more VRUs;

generating a full resolution segmentation map of the scene using one or more of the video frames,
wherein the generating of the full resolution segmentation map comprises applying a neural network architecture to one or more of the video frames to classify each pixel in the video frames as one of a plurality of predefined classes, each predefined class corresponding to a segment in the full resolution segmentation map;

estimating one or more intention probabilities using the estimated pose of the one or more VRUs and the full resolution segmentation map, each intention probability corresponding to one of the detected one or more VRUs based on physical interactions and causality between current behaviors and different elements of the scene; and adjusting one or more automated driving actions based on the estimated one or more intention probabilities, wherein the detecting, the generating, and the estimating are performed using a single holistic deep learning neural network model by sequentially correlating the estimated pose of the one or more VRUs and their corresponding behavior state with a segmented scene in the vicinity of each of the VRUs.

14. The computer-readable product of claim 13, wherein the operations further comprise:
estimating one or more behavior states based at least on the estimated pose of the one or more VRUs, each behavior state corresponding to one of the detected one or more VRUs; and
estimating future trajectories of the one or more VRUs using the estimated one or more behavior states.

15. The computer-readable product of claim 13, wherein the operations further comprise:
estimating the one or more behavior states based at least on the estimated pose of the one or more VRUs using a multi-task model; and
estimating the one or more intention probabilities based on the estimated one or more behavior states.

* * * * *